US012427879B2

(12) United States Patent
Hau et al.

(10) Patent No.: US 12,427,879 B2
(45) Date of Patent: Sep. 30, 2025

(54) BALANCING ELECTRICAL VEHICLE POWER DISTRIBUTION ACROSS A CHARGING LANE

(71) Applicant: GM Cruise Holdings LLC, San Francisco, CA (US)

(72) Inventors: Darren Hau, Menlo Park, CA (US); Lin-Zhuang Khoo, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 1029 days.

(21) Appl. No.: 17/496,695

(22) Filed: Oct. 7, 2021

(65) Prior Publication Data

US 2023/0116469 A1 Apr. 13, 2023

(51) Int. Cl.
*B60L 53/62* (2019.01)
*B60L 53/66* (2019.01)
*B60L 53/67* (2019.01)
*B60L 53/68* (2019.01)
*B60L 58/12* (2019.01)

(52) U.S. Cl.
CPC ............... *B60L 53/62* (2019.02); *B60L 53/66* (2019.02); *B60L 53/67* (2019.02); *B60L 53/68* (2019.02); *B60L 58/12* (2019.02); *B60L 2240/72* (2013.01)

(58) Field of Classification Search
CPC .......... B60L 53/62; B60L 53/66; B60L 53/67; B60L 53/68; B60L 58/12; B60L 2240/72; B60L 5/005; B60L 50/53; B60L 53/12
See application file for complete search history.

(56) References Cited

U.S. PATENT DOCUMENTS

| 2013/0057209 A1* | 3/2013 | Nergaard ................ B60L 1/003 320/109 |
| 2021/0086647 A1 | 3/2021 | Kiessling et al. |
| 2021/0184479 A1* | 6/2021 | Fukubayashi .......... B60M 7/003 |

* cited by examiner

*Primary Examiner* — David V Henze-Gongola
(74) *Attorney, Agent, or Firm* — Honigman LLP; Matthew H. Szalach; Jonathan P. O'Brien

(57) ABSTRACT

A charging facility provides a charging lane for charging electric vehicles (EVs). A charging system for charging the EVs in the lane includes a power management system and a set of chargers, each charger at a respective charging position along the charging lane. A load manager receives information about the EVs' charge levels and positions in the lane, and determines a charge rate for each EV. The power management system receives power from a power supply and distributes the power to the chargers according to the charging rates determined by the load manager, and the chargers deliver the power to the EVs.

16 Claims, 7 Drawing Sheets

BALANCING ELECTRICAL VEHICLE POWER DISTRIBUTION ACROSS A CHARGING LANE

TECHNICAL FIELD OF THE DISCLOSURE

The present disclosure relates generally to battery-powered electric vehicles fleets and, more specifically, to systems and methods for distributing power across a charging lane to charge electric vehicles along the charging lane.

BACKGROUND

Electric vehicles (EVs) are powered by batteries that need to be periodically charged. For fleet operations, EV batteries must be frequently recharged so that the EVs can continue providing service. Dedicated charging facilities can be built to charge EV fleets. Locating charging facilities in or near areas serviced by the EV fleet provides greater efficiency, since the EVs do not have to travel a long distance, taking time and draining battery power, to travel to and from the charging facility. However, space constraints within service areas (e.g., in densely populated cities) make it difficult to simultaneously charge a large number of EVs in such facilities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
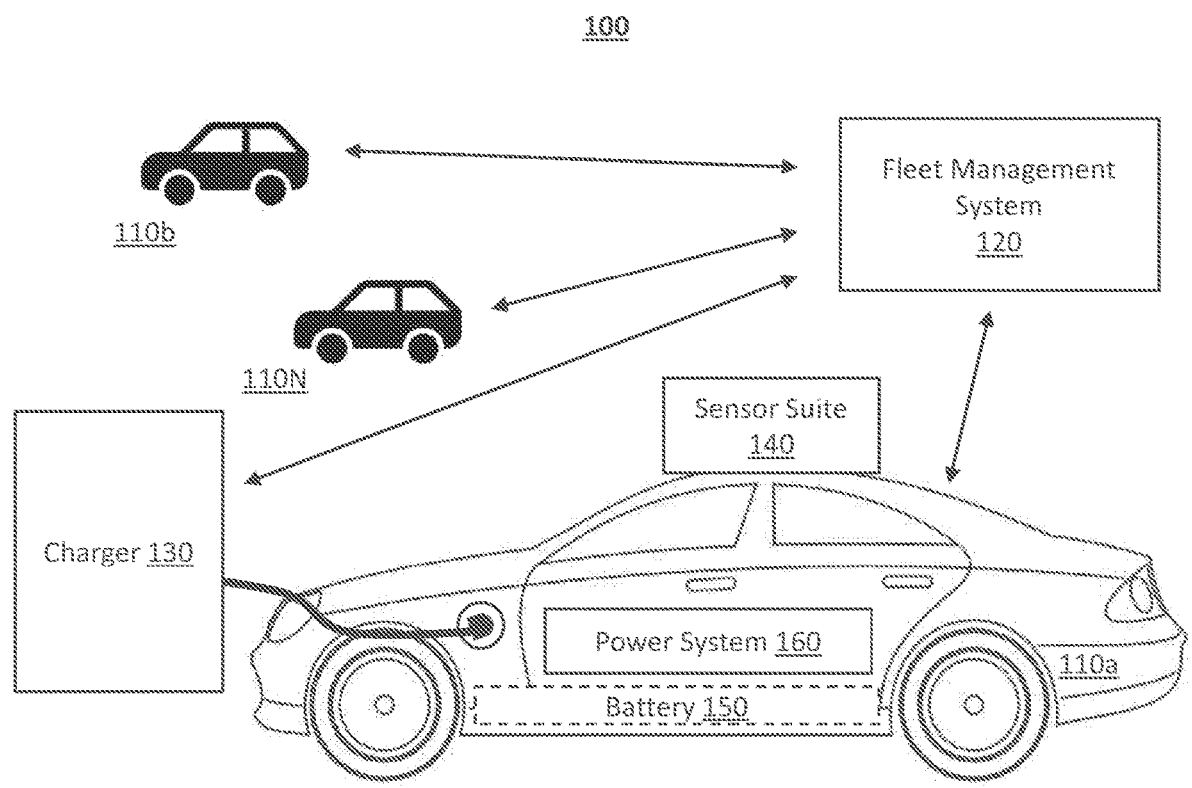
FIG. 1 is a block diagram illustrating a system including an example fleet of EVs, where one EV is being charged at a charger, according to some embodiments of the present disclosure.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Current EV charging setups typically include a space for an EV to park and a dedicated charging station next to the parking space to charge the EV. For example, a charging area for a set of EVs (e.g., an EV fleet, or multiple driver-owned EVs) may include a parking lot in which some or all of the parking spots have an EV charging station. The parking spots can be separately accessed, so that each EV can enter and exit the parking lot independently. This configuration requires substantial surface area to be used to allow EVs to navigate the parking lot to enter and exit each space. In typical implementations, there are two lanes, permitting two-way traffic, between rows of parking spaces. In such a configuration, as much as a third or even half of the surface area of the parking lot is devoted to EV ingress and egress from the parking spots; this surface area cannot be used to park and charge EVs. In addition, typical configurations include an independent charging station at each parking spot that provides EV charging. Each charging station may require a minimum power supply from a power source, and may provide current conversion circuitry (e.g., alternating current (AC) to direct current (DC)) and power modulation circuitry to adjust the output power to an EV.

A more space-efficient and hardware-efficient configuration for EV fleet charging is described herein. In an EV fleet in which EVs are generally interchangeable with at least some of the other EVs, each EV does not need to be able to enter or exit the charging facility at any time. To devote a greater portion of the surface area of the charging facility to charging EVs, rather than setting aside a large portion of the surface area for ingress and egress, chargers are arranged along lanes in which EVs can enter and exit from one or both ends of the lanes. An EV in the middle of a lane cannot enter and exit unless the EV or EVs in front of and/or behind the middle EV exit the lane. This allows a far greater proportion of the surface area of the charging facility to be devoted to charging EVs.

Because the EVs in the middle of a lane cannot freely exit the charging facility, it is inefficient to fully charge EVs in the middle of the lane before EVs at the end or ends of the lane are charged. Storing an EV with a battery at a full charge can degrade the battery, and using fast charging can also degrade the battery. To improve an EV fleet's battery performance over time, it is preferable to slowly charge the batteries of the EVs in the middle of the lane, if the EVs will not be able to exit the lane while outer EVs are continuing to charge. Furthermore, if a limited power supply is available, it is preferable to give charging preference to EVs at or near the end or ends of the lane, since these EVs exit the lane before EVs towards the middle of the lane exit.

As described herein, to provide balanced charging across a lane of EVs, the charging hardware is separated into power management systems and chargers. Each spot for EV charging has a dedicated charger, and multiple chargers are connected to a single power management system. For example, all of the chargers along a given lane can be connected to a single power management system that distributes power to EVs along the lane. The power management system can distribute power across multiple EVs based on the EVs' current charge levels and their positions along the lane. In some cases, the power management system distributes power such that the EVs on one or both ends of the lane reach a target charge level before EVs in the middle of the lane. In other cases, the power management system distributes power such that all of the EVs along a lane reach a target charge level at the same time or approximately the same time. After a lane of EVs reach their target charge level, they can all exit the lane, and different EVs can file into the lane for charging.

As used herein, a target charge level may be a full charge or a lower desired charge level (e.g., 80% or 90% of a full charge) for the EV battery to reach during charging. The target charge level may be different for different EVs, e.g., based on the battery health, intended use of the EV, or other factors. Charging an EV battery to 100% may degrade the battery, so selecting a target charge level that is below 100% of a full charge may improve battery life. However, fully charging the EV battery gives the EV a greater range before it needs to recharge.

Connecting a single power management system to multiple chargers can provide hardware efficiencies compared to typical EV charging systems. For example, by performing power modulation at the power management system, the individual EV-specific chargers do not need to include power modulation circuitry. In addition, the power management system can include current conversion circuitry, e.g., to convert AC power to DC power, so that the individual chargers do not need to include this circuitry. This creates a large reduction in the amount of power modulators and AC/DC converters required across a charging facility compared to typical charging configurations.

Embodiments of the present disclosure provide a system for charging EVs that includes a power management system, a plurality of chargers, and a load manager. The power management system receives power from a power source and distribute the power among a plurality of power outputs. The plurality of chargers are arranged along a charging lane, each of the chargers is coupled to a respective one of the plurality of power outputs to receive power from the power management system, and each of the chargers is configured to be coupled to a respective one of a plurality of EVs positioned along the charging lane. The load manager receives data describing charge levels of batteries of the plurality of EVs, and determines an amount of power for the power management system to distribute to each of the plurality of EVs based on their charge levels and their respective charging positions along the charging lane.

Further embodiments of the present disclosure provide a method for charging EVs that includes receiving current charge levels for each of a plurality of EVs arranged along a charging lane, the charging lane comprising a plurality of chargers for charging the plurality of EVs; determining an amount of available power for charging the plurality of EVs arranged along the charging lane; determining, for each of the plurality of EVs, an amount of power to distribute to the EV, wherein the amount of power to distribute to a particular EV is based on a position of the EV along the charging lane and the current charge level of the EV; and distributing power to at least a portion of the plurality of EVs based on the determined amounts of power.

Additional embodiments of the present disclosure provide a system for charging EVs that includes a plurality of chargers and a load manager. The plurality of chargers are arranged along a charging lane, and the charging lane has a plurality of charging positions and an exit point. A first charging position is situated between a second charging position and the exit point. Each of the chargers is coupled to a power source to receive power from the power source, and each of the chargers is configured to be coupled to a respective one of a plurality of EVs positioned at a respective charging position. The load manager receives data describing charge levels of batteries of the plurality of EVs and the charging positions of the plurality of EVs within the charging lane. The load manager also determines an amount of power for each of the plurality of chargers to distribute to each of the plurality of EVs based on their charge levels and their respective charging positions.

As will be appreciated by one skilled in the art, aspects of the present disclosure, in particular aspects of balancing power distribution to EVs across a charging lane, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example System for EV Charging

FIG. 1 is a block diagram illustrating a system 100 including an example fleet of EVs, where one EV is being charged at a charger. The system 100 includes a fleet of electric vehicles (EVs) 110, including EV 110a, EV 110b, and EV 110N, a fleet management system 120, and a charger 130. For example, a fleet of EVs may include a number N of EVs, e.g., EV 110a through EV 110N. Some or all of the EVs 110 may be autonomous vehicles (AVs). EV 110a includes a sensor suite 140, a battery 150, and a power system 160. EVs 110b through 110N also include the sensor suite 140, battery 150, and power system 160. A single EV in the fleet is referred to herein as EV 110, and the fleet of EVs is referred to collectively as EVs 110.

In some embodiments, each EV 110 is a fully autonomous electric automobile. In other embodiments, each EV 110 may additionally or alternatively be another semi-autonomous or fully autonomous vehicle; e.g., a bus, a boat, an unmanned aerial vehicle, a driverless car, etc. Additionally, or alternatively, the EV 110 may be a vehicle that switches between a semi-autonomous state and a fully autonomous state and thus, the EV may have attributes of both a semi-autonomous vehicle and a fully autonomous vehicle depending on the state of the vehicle. In some embodiments, some or all of the EVs 110 are non-autonomous electric vehicles. In general, the EVs 110 may be any autonomous or non-autonomous rechargeable vehicle. For example, the EVs 110 may be rechargeable busses, trams, trucks (e.g., semi trucks, delivery trucks, etc.), construction vehicles, locomotives, golf carts, or scooters.

In embodiments where the EVs 110 are autonomous, each EV 110 may include a throttle interface that controls an engine throttle, motor speed (e.g., rotational speed of electric motor), or any other movement-enabling mechanism; a brake interface that controls brakes of the EV (or any other movement-retarding mechanism); and a steering interface that controls steering of the EV (e.g., by changing the angle of wheels of the EV). The EV 110 may additionally or alternatively include interfaces for control of any other vehicle functions; e.g., windshield wipers, headlights, turn indicators, air conditioning, etc.

The EV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUs), accelerometers, microphones, strain gauges, pressure monitors, barometers, thermometers, altimeters, ambient light sensors, etc. The sensors may be located in various positions in and around the EV 110.

An onboard computer (not shown in FIG. 1) is connected to the sensor suite 140 and functions to control the EV 110 and to process sensed data from the sensor suite 140 and/or other sensors in order to determine the state of the EV 110. Based upon the vehicle state and programmed instructions, the onboard computer modifies or controls behavior of the EV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The battery 150 is a rechargeable high voltage battery that powers the EV 110. The battery 150 may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the EV 110 is a hybrid electric vehicle that also includes an internal combustion engine for powering the EV 110, e.g., when the battery 150 has low charge.

The power system 160 controls the power and operation of the battery 150, as well as the distribution of power within the EV. The power system 160 may switch between various power modes, including a charging mode, in which the battery 150 is charged from the charger 130, and a discharging mode, in which the battery 150 is discharged and power drawn from the battery 150 powers one or more subsystems of the EV 110. The power system 160 may include or interface with battery sensors for determining a current charge level of the battery 150. The power system 160 interfaces with the charger 130 to initiate charging, transmit a charge level or other battery characteristics to the charger 130, and end a charging session. The power system 160 may coordinate power distribution to various subsystems; for example, during charging, the power system 160 distributes power to one subset of subsystems (e.g., a communication subsystem and an autonomous driving sensor subsystem) and does not provide power to a different set of subsystems (e.g., a propulsion subsystem); during operation of the EV 110, the power system 160 distributes power to a different subset of subsystems (e.g., a subset that includes the propulsion subsystem), or all to subsystems of the EV 110.

The fleet management system 120 manages the fleet of EVs 110. The fleet management system 120 may manage a service that provides or uses the EVs 110, e.g., a service for providing rides to users with the EVs 110, or a service that delivers items, such as prepared foods, groceries, or packages, using the EVs 110. The fleet management system 120 may select an EV from the fleet of EVs 110 to perform a particular service or other task, and instruct the selected EV (e.g., EV 110a) to autonomously drive to a particular location (e.g., a delivery address). The fleet management system 120 also manages fleet maintenance tasks, such as charging and servicing of the EVs 110. As shown in FIG. 1, each of the EVs 110 communicates with the fleet management system 120. The EVs 110 and fleet management system 120 may connect over a public network, such as the Internet.

The charger 130 charges batteries of EVs 110. The charger 130 shown in FIG. 1 has a cord and a plug; the plug is plugged into a socket of the EV 110a. In other embodiments, the charger 130 is a wireless charger, e.g., an inductive charger, or another type of charger. The charger 130 may provide an alternating current (AC), such as an AC level 2 charger, or the charger 130 may provide a direct current (DC), which may deliver charge at a faster rate. Multiple chargers 130 may be coupled to a power management system that distributes power, through the chargers 130, to multiple EVs 110 simultaneously. Example implementations of a charging system that includes chargers 130 and a power management system are shown in FIGS. 2, 4, 6, 7, 8, 10, and 11. More generally, various charging configurations and methods are described with respect to FIGS. 2-11. The charger 130 may communicate with the EV 110a through a wired connection (e.g., through the cord and plug shown in FIG. 1) or through a wireless connection (e.g., Bluetooth or WiFi). The charger 130 may also communicate with the fleet management system 120, e.g., over the Internet.

The fleet management system 120 may be associated with a network of chargers 130. For example, an operator of the fleet management system 120 may provide multiple charging facilities, each including one or more chargers 130. At least some of the charging facilities may include charging lanes, as described with respect to FIG. 2. Charging facilities in the network may be distributed across one or more geographic regions in which the fleet of EVs 110 provides service. In some embodiments, EVs 110 may also use charging stations outside of the network operated by the fleet management system 120, e.g., charging stations available to the public, charging stations in private homes, charging stations on corporate campuses, etc.

Example Charging Facility for Lane-Based Charging

Figure 2:
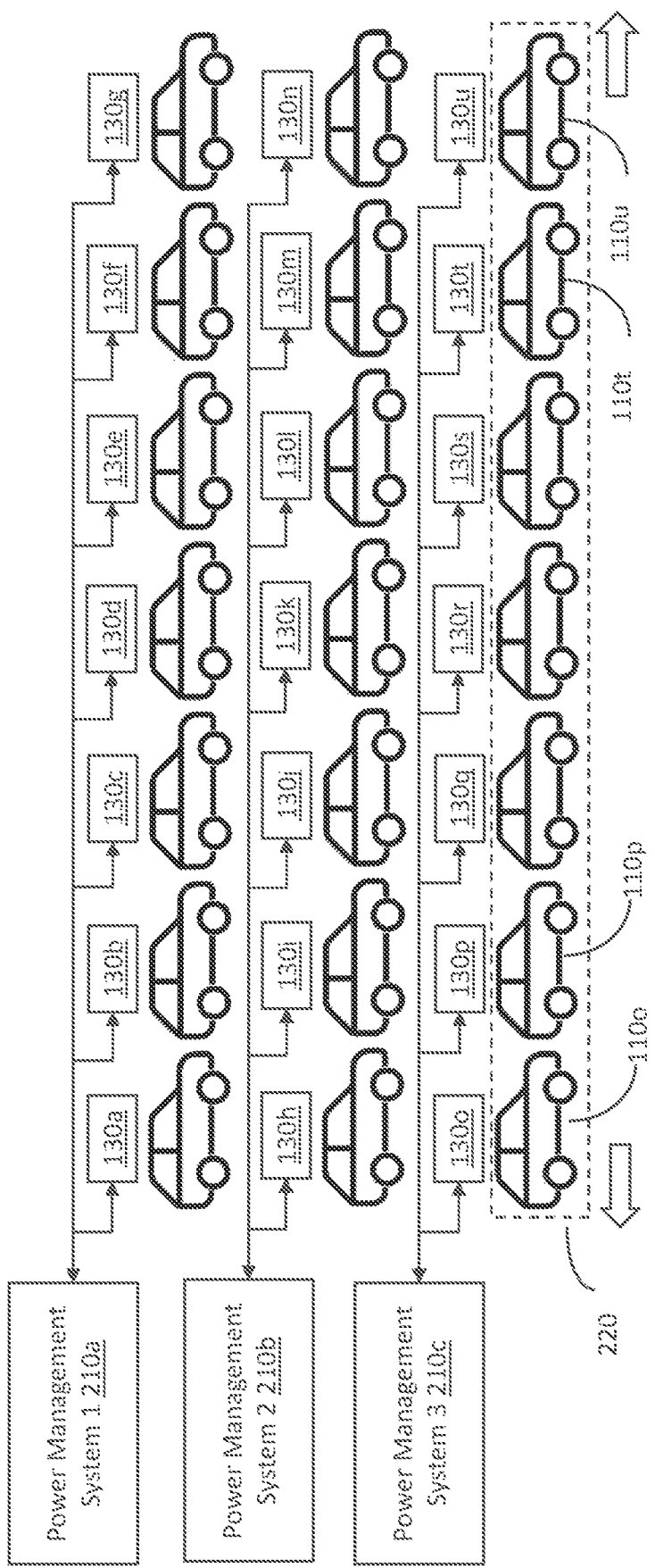
FIG. 2 illustrates a set of EVs arranged along charging lanes that each include multiple chargers coupled to a power management system, according to some embodiments of the present disclosure.

FIG. 2 illustrates a set of EVs arranged along charging lanes that each include multiple chargers coupled to a power management system according to some embodiments of the present disclosure. FIG. 2 shows three lanes of EVs 110, where each EV 110 is connected to a respective charger 130. Along each lane, the chargers 130 are connected to a power management system 210 that distributes power to the chargers 130 connected to it. In particular, power management system 1 210a is coupled to seven chargers 130a-130g, power management system 2 210b is coupled to seven chargers 130h-130n, and power management system 3 is coupled to seven chargers 1300-130u. Each of set of chargers 130a-130g, 130h-130n, and 1300-130u is arranged along a charging lane, e.g., the chargers 1300-130u are arranged along the charging lane 220. Each of the chargers 130 corresponds to a charging position, where an EV 110 can park and receive power from the charger 130. While three charging lanes, each having seven chargers and seven corresponding charging positions, are illustrated in FIG. 2, it should be understood that a charging lane may have more or fewer chargers 130 and charging positions, and a charging facility may have more or fewer charging lanes 220. In some embodiments, each charger 130 may correspond to two or more charging positions, e.g., if a charger 130 can simultaneously connect to and charge two or more EVs.

Along a charging lane, each EV 110 may only enter or exit from the front or the back of the lane. The front and back of the lane may be referred to as exit points. For example, a charging lane has a charging position 1 at one end of the lane, and a charging position N at an opposite end of the lane. The full lane of charging positions are arranged as N, N-1, N-2, . . . 3, 2, 1, where charging position 1 is at the front of the lane, and charging position N is at the back of the lane, and the exit points are behind charging position N and in front of charging position 1. The EVs 110 may generally drive and be oriented from the back of the lane to the front, e.g., an EV 110 pulls into the charging lane at charging position N and drives forward towards charging position 1. An EV 110 at position 2 cannot exit the charging lane (pulling forward) until the EV 110 at charging position 1 exits the lane. In some cases, EVs 110 may reverse into or out of the lane. In such cases, an EV 110 at charging position N-1 cannot reverse out of the charging lane until an EV 110 at charging position N exits the charging lane. In other cases, EVs 110 can only pull forward, and the back of the charging is not considered an exit point.

For the charging lane 220 illustrated in FIG. 2, when the EV 110u reaches its target charge level, it can pull forward through the exit point and out of the charging lane 220, as indicated by the arrow below the EV 110u. When the EV 110o reaches its target charge level, it can back out of the charging lane 220, as indicated by the arrow below the EV 110o. EVs in the middle of the charging lane, e.g., EVs 110p-110t in lane 220, wait until all of the EVs in front of or behind them have exited the lane to pull out. For example, EV 110t can pull forward and out of the charging lane 220 after the EV 110u has left its charging position; EV 110p can back out of the charging lane 220 after the EV 110o has left its charging position. As another example, if the EV 110o is still in its charging position, but all of the EVs 110 in front of EV 110p have left their charging positions, the EV 110p may pull forward to exit the charging lane 220.

In some embodiments, a charging lane or charging facility may be intended for one-way traffic, e.g., an EV 110 pulls into the charging lane in one direction, and exits the charging lane in the same direction, rather than backing out of the lane. For example, in charging lane 220, the front-most EV 110u in the charging lane 220 pulled into the charging lane 220 first, followed by EV 110t, etc. When the EVs exit the charging lane 220, the front-most EV 110u exits first, followed by EV 110t, etc., until EV 110o exits the charging lane 220. After all of the EVs 110 have exited the lane, a new set of EVs 110 may pull into the charging lane 220 for charging.

In some embodiments, when an EV 110 has completed charging and exited the charging lane, other EVs 110 in the lane may change their positions. For example, if EV 110u reaches a full charge and exits the charging lane 220, the other EVs 1100-110t may each move up a position, so that EV 110t connects to the charger 130u, the EV 110o connects to the charger 130p, etc. This allows another EV 110 to enter the back of the lane and connect to the charger 1300. However, due to the time involved in disconnecting the EVs 110 from their chargers 130, moving the EVs 110, and reconnecting to other chargers 130, it may be preferable to have the EVs 110 continue charging at their initial charging positions. If the inductive charging is used, this can reduce the time involved in moving the EVs 110 from one charging position to another and having to be unplugged from one charger and plugged into another charger, but there is still some loss of charging time involved in ramping down and ramping up charging.

While the EVs 110 illustrated in FIG. 2 are shown as facing the same direction, in some cases, different EVs 110 along a given lane may face different directions. In some cases, EVs 110 may also enter or exit a lane from different sides, e.g., EV 110$u$ may enter from the front of the lane (closest to the charger 130$u$), while EV 110$o$ enters from the back of the lane (closest to the charger 130$o$).

As noted above, each of the chargers 130 along the charging lane are coupled to a power management system 210. The power management system 210 distributes power to the connected chargers 130, and the chargers 130 deliver the power they receive from the power management system 210 to their respective EVs 110. While FIG. 2 illustrates one power management system 210 for each charging lane, in other embodiments, two or more power management systems 210 may distribute power to subsets of chargers 130 in a single lane (e.g., a first power management system 210 distributes power to chargers 130$a$-130$d$, and a second power management system 210 distributes power to chargers 130$e$-130$g$). Alternatively, one power management system 210 may distribute power to chargers arranged along multiple lanes, e.g., a single power management system 210 distributes power to chargers 130$a$-130$n$.

The power management system 210 distributes power to the chargers 130 based on instructions from a load manager. The load manager receives data describing the charge level, also referred to as state of charge (SoC), of each of the EVs 110 along a given lane. The load manager also knows the charging positions of the EVs 110 along the lane. The load manager determines an amount of power for the power management system 210 to distribute to each EV 110 (via the chargers 130) based on the EV's charge levels and their respective positions along the charging lane. In particular, the load manager may determine to distribute power such that an EV 110 at one or both ends of the lane (e.g., EV 110$u$ and/or 110$o$ in the charging lane 220) reach a target charge level before other EVs 110 in the charging lane 220. This prevents EVs 110 in the middle of the lane from reaching a full charge and then getting "trapped" while EVs closer to the end of the charging lane are still charging. Alternatively, the load manager may determine to distribute power such that the EVs 110 along a given charging lane each reach a target charge level at the same time or approximately the same time. This allows the full charging lane to be vacated simultaneously or within a short time window (e.g., 5 minutes).

Example Power Management System

Figure 3:
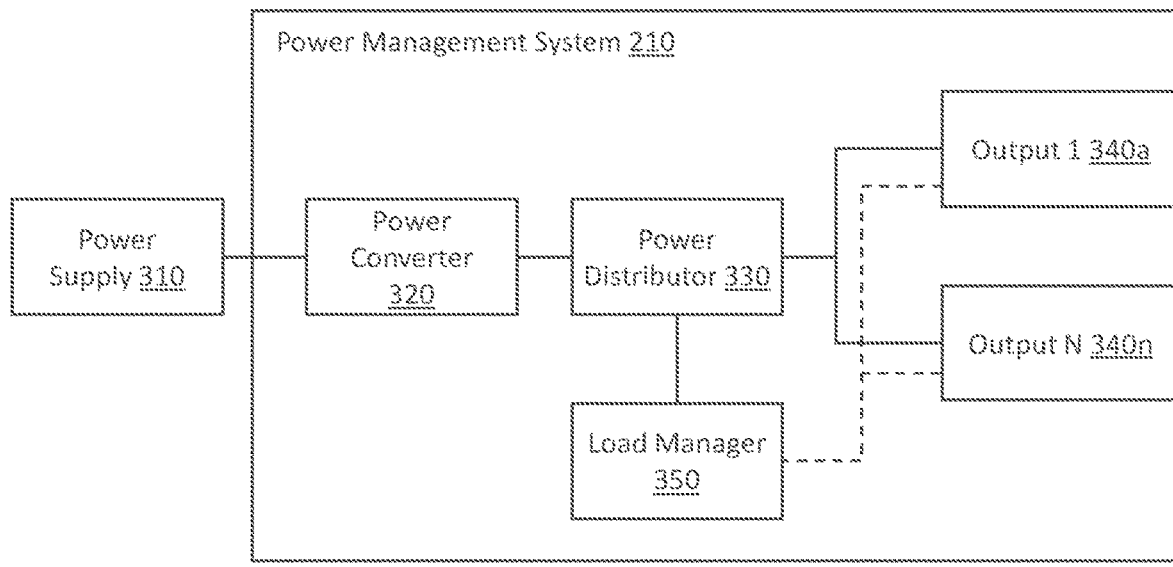
FIG. 3 is a block diagram of an example power management system, according to some embodiments of the present disclosure.

FIG. 3 is a block diagram of an example power management system 210, according to some embodiments of the present disclosure. The power management system 210 is coupled to a power supply 310. The power management system 210 includes a power converter 320, a power distributor 330, a set of outputs 340, and a load manager 350. In alternative configurations, different, fewer, and/or additional components may be included in the power management system 210. For example, in some embodiments, the power management system 210 does not include a power converter. As another example, in some embodiments, the load manager 350 is implemented outside the power management system 210, and the power management system 210 includes a network connection to communicate with the load manager 350. Further, functionality attributed to one component of the power management system 210 may be accomplished by a different component included in the power management system 210 or a different system than those illustrated.

The power supply 310 is a supply of power to the charging facility. The power supply 310 may include a connection to a power grid; one or more battery modules; solar panels, wind turbines, or other local power sources installed at or near the charging facility; or other sources of power. In some embodiments, the power supply 310 provides a limited amount of power, e.g., the amount of power provided by the power supply 310 is less than required to provide the fastest charge rate to all of the charging positions in the charging facility.

The power converter 320 receives power from the power supply. Most electrical grids deliver AC power, while EV batteries store and distribute DC power. Some EVs 110 include onboard chargers that can convert received AC to DC for storage, but charging EV batteries with DC power generally enables faster charging. The power converter 320 converts the received AC power to DC power for charging the EV batteries 150. By converting AC to DC at the power management system 210, a power converter does not need to be included in the individual chargers 130. This provides hardware efficiencies compared to typical charging implementations, in which each charging station includes an AC to DC converter. If the power supply 310 provides DC (e.g., if the power supply 310 is a battery), the power converter 320 need not be included in the power management system 210. In some embodiments, different power sources may be used at different times (e.g., solar panels during the day, batteries during nighttime, and grid backup if the solar panels and batteries do not provide sufficient power); if the power source delivers DC, the power converter 320 can be bypassed. In other embodiments, the power management system 210 distributes AC to the chargers 130, which may independently perform the AC to DC conversion, or may output AC to the EVs 110.

The power distributor 330 receives power from the power converter 320 or power supply 310 (if the power converter 320 is bypassed or not included). The power distributor 330 also receives instructions from the load manager 350 indicating how much power to distribute to each of the EVs 110 in the charging lane, i.e., to each of the chargers 130 coupled to the EVs 110. In this example, the power management system 210 has a set of outputs 340$a$ through 340$n$, where each of the outputs 340 corresponds to a charger 130. For a particular EV 110, the power distributor 330 outputs the amount of power indicated by the load manager 350 to the output 340 associated with the EV 110, e.g., the power distributor 330 may output 50 kW to output 1 340$a$ to provide 50 kW to the EV 110 coupled to the charger 130 that is coupled to output 1 340$a$.

In some embodiments, the outputs 340 also enable communication from the EVs 110 to the power management system 210. An EV 110 may output its current charge level and/or other battery parameters to a charger 130, and the charger 130 transmits the data from the EV 110 to the power management system 210 via the output 340. The outputs 340 transmit the received data to the load manager 350, which uses the data to determine how much power to distribute to each EV 110. An example process performed by the load manager 350 to determine how much power to distribute to each EV 110 is described with respect to FIG. 5.

Example Power Distribution Scheme

Figure 4:
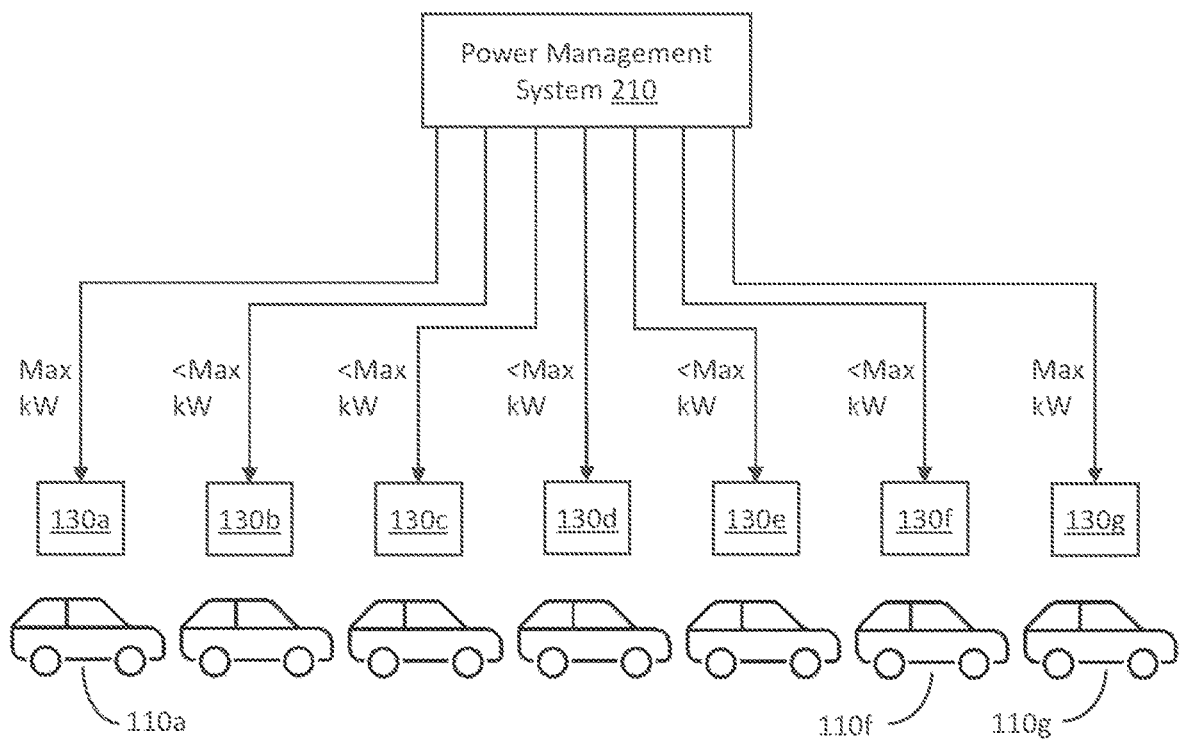
FIG. 4 illustrates the power management system distributing power to EVs along a charging lane, with the ends of the lanes receiving the most power, according to some embodiments of the present disclosure.

FIG. 4 illustrates the power management system distributing power to EVs along a charging lane, with the ends of the lanes receiving the most power, according to some embodiments of the present disclosure. In this example, the power management system 210 distributes a maximum power, represented as Max kW, to the chargers 130a and 130g at the two ends of the charging lane. The power management system 210 distributes lower power, represented as <Max kW, to the EVs 110 in the middle of the charging lane. This may result in the EVs 110a and 110g at the ends of the lane reaching a target charge level prior to the EVs in the middle of the charging lane. After an EV 110 at the end of the charging lane (e.g., EV 110g) reaches its target charge level, the power management system 210 may distribute the Max kW to the next EV in the lane (e.g., EV 110f).

The EVs 110 in the middle of the lane may all receive the same power, e.g., the EVs 110a and 110g at the ends of the lane receive 200 kW, and the EVs in the middle of the lane all receive 50 kW. In other examples, the power to each EV may resemble a V-shape, with the ends receiving the highest power, and the center receiving the lowest power (e.g., moving across the lane, 200 kW, 150 KW, 100 KW, 50 kW, 100 KW, 150 KW, 200 kW). The power distributed to the EVs 110 in the middle of the charging lane may depend on the amount of power available from the power supply 310, e.g., EVs towards the middle may receive more power if the power supply 310 has more power available, or if the cost of energy is relatively low.

In some cases, this power distribution scheme may not result in an optimal charge distribution. For example, if the EVs at the ends of the lanes charge significantly faster than the EVs in the middle of the lane, the overall time to charge the full lane of EVs and vacate the lane may be longer than if all of the EVs 110 received a more uniform power. Furthermore, this power distribution scheme does not take the current charge levels into account. For example, if EV 110g has a higher initial charge level than EV 110f, providing the highest power to EV 110g results in EV 110g obtaining its target charge significantly sooner than EV 110f, but it may be more efficient for EV 110g and EV 110f to obtain their target charge levels at around the same time. Therefore, in some embodiments, the load manager 350 obtain battery and power supply data and determines a specific charging rate for each EV 110 receiving power from the power management system 210.

Example Process for Determining Power Distribution

Figure 5:
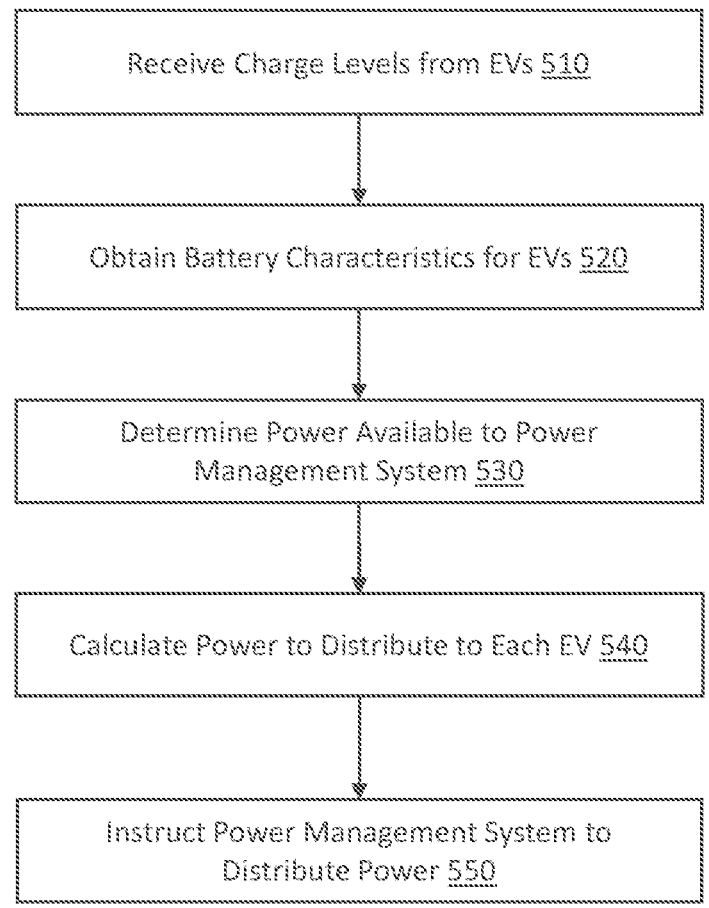
FIG. 5 is a flowchart showing a process for determining power to distribute to EVs along a charging lane, according to some embodiments of the present disclosure.

FIG. 5 is a flowchart showing a process for determining power to distribute to EVs along a charging lane, according to some embodiments of the present disclosure. The load manager 350 receives 510 charge levels from the EVs 110 along a given charging lane. As described with respect to FIG. 3, the EVs 110 may report their charge levels to the power management system 210 via the chargers 130. Alternatively, the EVs 110 may report their charge data to the load manager 350 (e.g., a cloud-based load manager) via a network connection, e.g., via an Internet connection. The load manager 350 associates each charge level with the respective charging position of the EV having that charge level along the charging lane.

In some embodiments, the load manager 350 obtains 520 other battery characteristics for the EVs 110. The load manager 350 may receive battery characteristic data from the EVs 110 themselves and/or from the fleet management system 120, which may maintain battery data for the various EVs 110 in the fleet. The battery characteristic data may include, for example, the age of the battery, a target charge level for the battery, and/or historical charging data (e.g., number of charge/discharge cycles) for the battery. Other battery characteristics may include total battery capacity, state-of-health (SoH) (e.g., the ratio of maximum deliverable capacity to initial capacity), the remaining useful life (RUH), and/or expected time to reach a full charge. In some embodiments, the EV 110 and/or the charger 130 include one or more sensors that measure electrical and environmental properties of the battery, such as current sensors, voltage sensors, temperature sensors, pressure sensors, humidity sensors, etc., and the EV 110 and/or charger 130 transmit the sensor data to the load manager 350. The load manager 350 further associates the battery characteristics of an EV with the EV's charging position in the charging lane.

The load manager 350 further determines 530 an amount of power available to the power management system 210. The amount of available power may depend on the amount of power available from the power supply 310, the current price of energy on a grid, a storage capacity of the charging facility (e.g., if the charging facility stores locally generated power in batteries), the number of power management systems 210 in the charging facility, the current and/or expected power draw from other power management systems 210 in the charging facility, and/or other factors. For example, if the charging facility has a power supply 310 of 5000 kW, and the charging facility has 5 power management systems 210 which are all being used, a given power management system 210 may have 1000 kW available to distribute among the EVs coupled to the power management system 210.

Having obtained the charge levels, battery characteristics, and available power, the load manager 350 calculates 540 power to distribute to each EV 110 based on the EVs' positions in the charging lane, their charging levels, the battery characteristics, and the power available. In one example, the load manager 350 determines the charging rates such that the EVs in a given charging lane reach their target charge levels at the same time or approximately the same time. In another example, the load manager 350 determines the charging rates such that the EVs at the outer charging positions of the charging lane reach a full charge the fastest, followed by the second-outermost charging positions, etc. The load manager 350 may set a maximum charging rate for one or more EVs based on their battery characteristics (e.g., setting lower maximum charging rates for older batteries to help increase their lifespans), and determine the charging rates based on these limits.

The total amount of power distributed by the power management system 210 is less than or equal to the available power. In some cases, the total amount of power distributed to by the power management system 210 is less than the sum of the maximum charging rates of the EVs, i.e., at least some of the EVs are not charged at their maximum charging rate. For example, if a first EV at an end position in a charging lane (e.g., EV 110u in FIG. 2) has a lower initial charge than a second EV that is not in an end position (e.g., EV 110t in FIG. 2), the first EV at the end position may receive a higher charge rate than the second EV, and the second EV does not receive its maximum charge rate. This reduces battery strain on the second EV (by charging it at a slower rate) and prevents the second EV from reaching its target charge level before the first EV in the end position reaches its target charge level.

Having determine the power to distribute to each EV 110, the load manager 350 instructs 550 the power management system 210 to distribute power according to the determined rates. The load manager 350 may recalculate the power to distribute to each EV 110 in the charging lane at regular intervals while the EVs are charging, e.g., every 10 seconds, every minute, every 5 minutes, etc. Alternatively or additionally, the load manager 350 may recalculate the power for each EV in the charging lane in response to particular events, such as an EV 110 leaving the charging lane, or another EV 110 entering the charging lane. The load manager 350 may repeat any of the steps 510-530 prior to recalculating the power to distribute, e.g., if any of the parameters change between calculations. Furthermore, the steps 510, 520, and 530 may be performed in any order or simultaneously.

In some embodiments, the load manager 350 receives demand information describing demand for AV services in a region around the charging facility, and the load manager 350 determines the charging rates based on the demand information. The fleet management system 120 may provide demand information based on real-time service requests and/or historical demand levels to the load manager 350. For example, the fleet management system 120 may indicate how many EVs should be dispatched and when, e.g., if several charged EVs are needed to meet expected demand within a short period of time (e.g., 10 minutes or 30 minutes), or if demand in the region of the charging facility is low relative to the number of available vehicles. The load manager 350 can adjust the charging rates to the EVs 110 based on the demand information, e.g., deciding to provide a fast charge to certain EVs if they are to be dispatched soon, or providing a slower charge to the EVs if demand is low. The load manager 350 can recalculate the power to distribute to EVs 110 in the charging lane in response to receiving new demand information from the fleet management system 120, e.g., in response to a sudden spike in demand.

In some embodiments, the load manager 350 develops a charging plan for EVs 110 before they enter a charging lane, and the load manager 350 instructs EVs to enter the lane in a specific order based on the charging plan. For example, if a first EV has a significantly higher charge level than a second EV, and the first EV can reach its target charge level faster than the second EV, the load manager 350 may instruct the first EV to enter the charging lane first, so that it can exit the charging lane as soon as it reaches a full charge, and instruct the second EV to enter near the middle of the charging lane, so that it does not trap other EVs in the charging lane. As another example, if the load manager 350 determines, based on the battery characteristics, that a first EV should receive a slower charge rate than a second EV, the load manager 350 may instruct the second EV to enter the charging lane first, so that it can exit the charging lane as soon as it reaches a full charge, and instruct the first EV to enter near the middle of the charging lane, so that it does not trap other EVs in the charging lane while it is charging more slowly.

Example Configurations for Power Distribution

Figure 6:
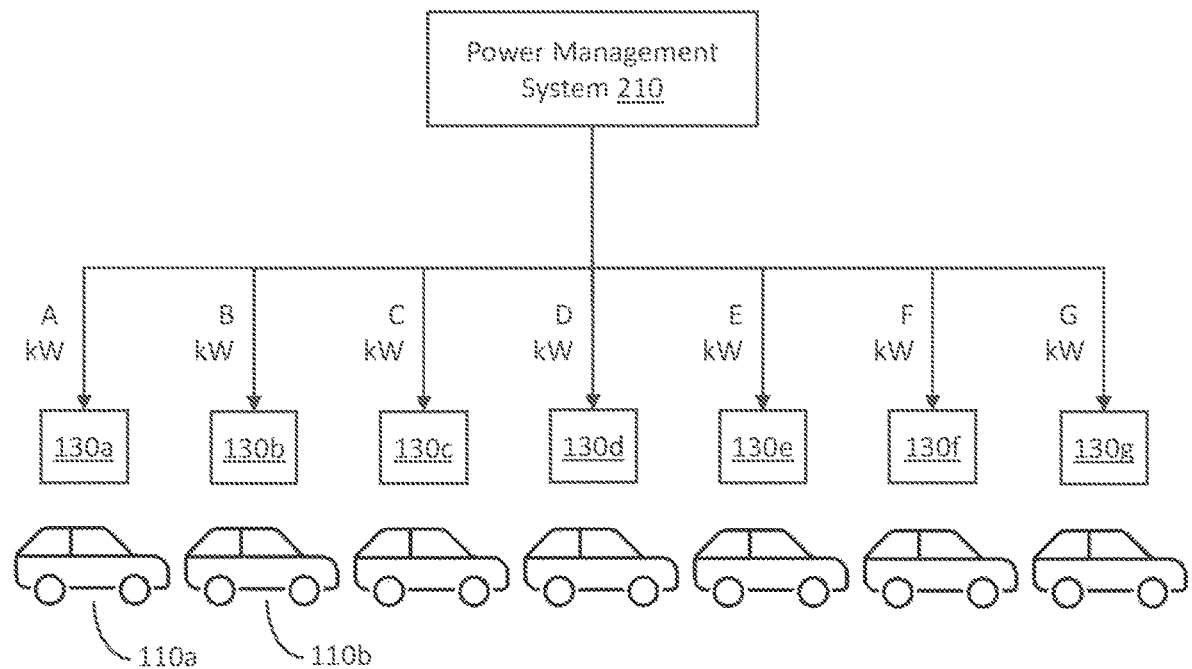
FIG. 6 illustrates the power management system distributing power to EVs along a charging lane according to calculations by the load manager, according to some embodiments of the present disclosure.

FIG. 6 illustrates the power management system distributing power to EVs along a charging lane according to calculations by the load manager, according to some embodiments of the present disclosure. The power management system 210 is distributing power to the chargers 130a-130g at different charge levels specifically selected for the EVs 110 coupled to the different chargers. For example, the power management system 210 distributes a first amount of power, A kW, to the charger 130 to deliver to EV 110a, and the power management system 210 distributes a second amount of power B kW, to the charger 130b to deliver to EV 110b. The amounts of power are determined by the load manager 350, as described with respect to FIG. 5.

Figure 7:
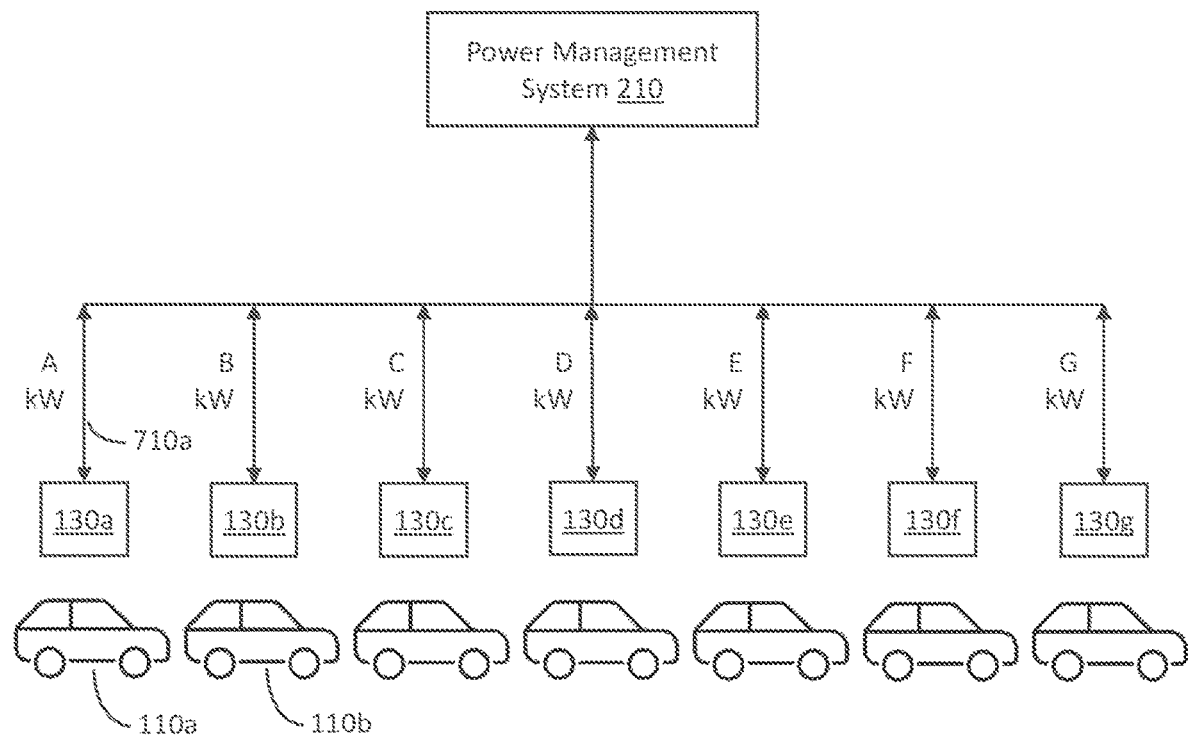
FIG. 7 illustrates the power management system distributing power to EVs along a charging lane where the chargers are configured for bidirectional power flow, according to some embodiments of the present disclosure.

In some embodiments, one or more of the chargers 130 may be configured for bidirectional charge flow, i.e., the charger 130 can either send power to the battery of the EV or draw power from the battery of the EV. FIG. 7 illustrates the power management system distributing power to EVs along a charging lane where the chargers are configured for bidirectional power flow, according to some embodiments of the present disclosure. The bidirectional power flow is indicated by the dual-direction arrows extending out of the chargers 130, e.g., arrow 710a from charger 130a. If the charger 130 draws power from an EV battery, the charger 130 transmits the power to the power management system 210, which redistributes the power to one or more of the other EVs in the charging lane. While each of the chargers 130 in FIG. 7 is shown as being capable of bidirectional charge flow, in some cases, only one or a subset of the chargers 130 may be capable of bidirectional charge flow, e.g., the end chargers 130a and 130g may only be equipped to send power to an EV but not to draw power from an EV.

If the power distribution system 210 is enabled for bidirectional charge flow, the load manager 350 may, in some cases, determine to draw power from an EV and distribute it to another EV. This may be advantageous if an EV near the middle of the lane has a relatively high charge level, and/or if the available power supply is limited. The load manager 350 may determine a total amount of energy (e.g., X kWh) or power (e.g., X kW) to draw from one EV and to transfer to one or more other EVs along the charging lane.

Figure 8:
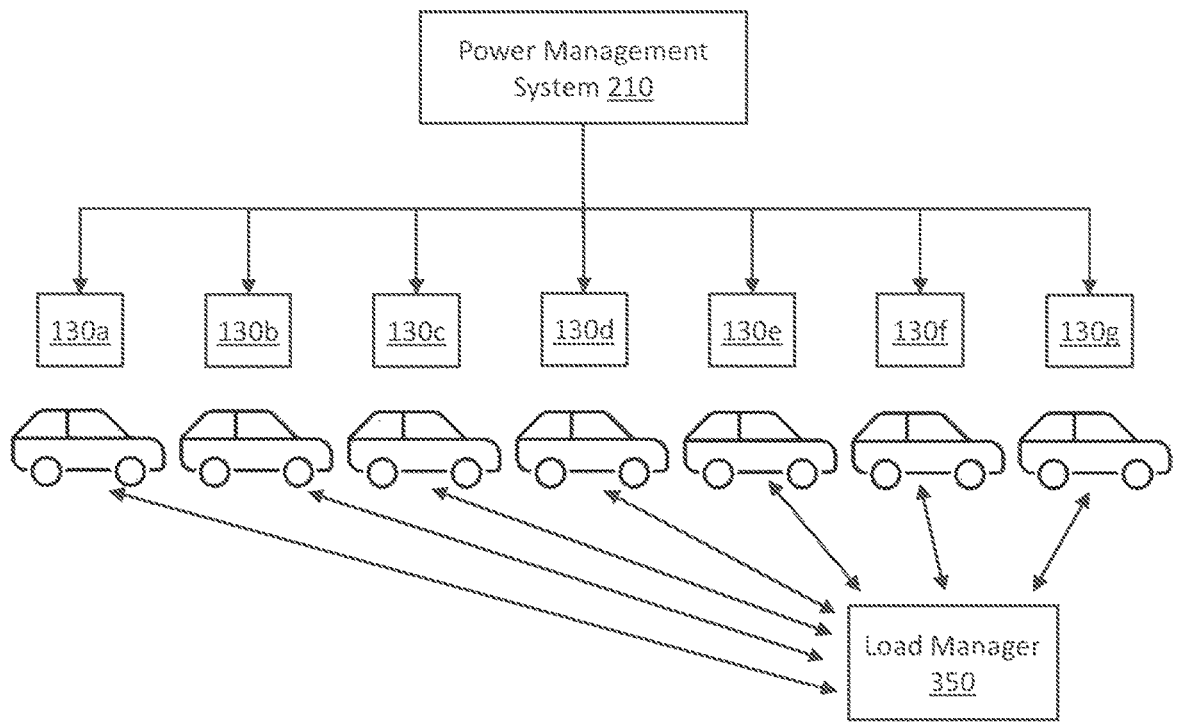
FIG. 8 illustrates the power management system distributing power to EVs along a charging lane where a load manager is network-connected to the EVs, according to some embodiments of the present disclosure.

As noted with respect to FIG. 3, in some embodiments, the load manager 350 is separate from the power management system 210. FIG. 8 illustrates the power management system 210 distributing power to EVs along a charging lane where the load manager 350 is network-connected to the EVs, according to some embodiments of the present disclosure. In this case, the EVs 110 transmit their charge level and/or other battery characteristics to the load manager 350 via a network connection, e.g., over the Internet. The load manager 350 may be implemented, for example, in the fleet management system 120, by another cloud-based service, by a server or device located at the charging facility, etc. The load manager 350 may receive power supply information from the power management system 210, directly from the power supply 310, or from another source. The load manager 350 determines the charge rates for each of the EVs as described with respect to FIG. 5. In some embodiments, the load manager 350 transmits instructions to the power management system 210 to distribute power based on the determined charge rates. In other embodiments, the load manager 350 instructs each EV in the charging lane to request, from the charger 130, power at a particular charge rate, and the charger 130 requests this charge rate from the power management system 210.

Figure 9:
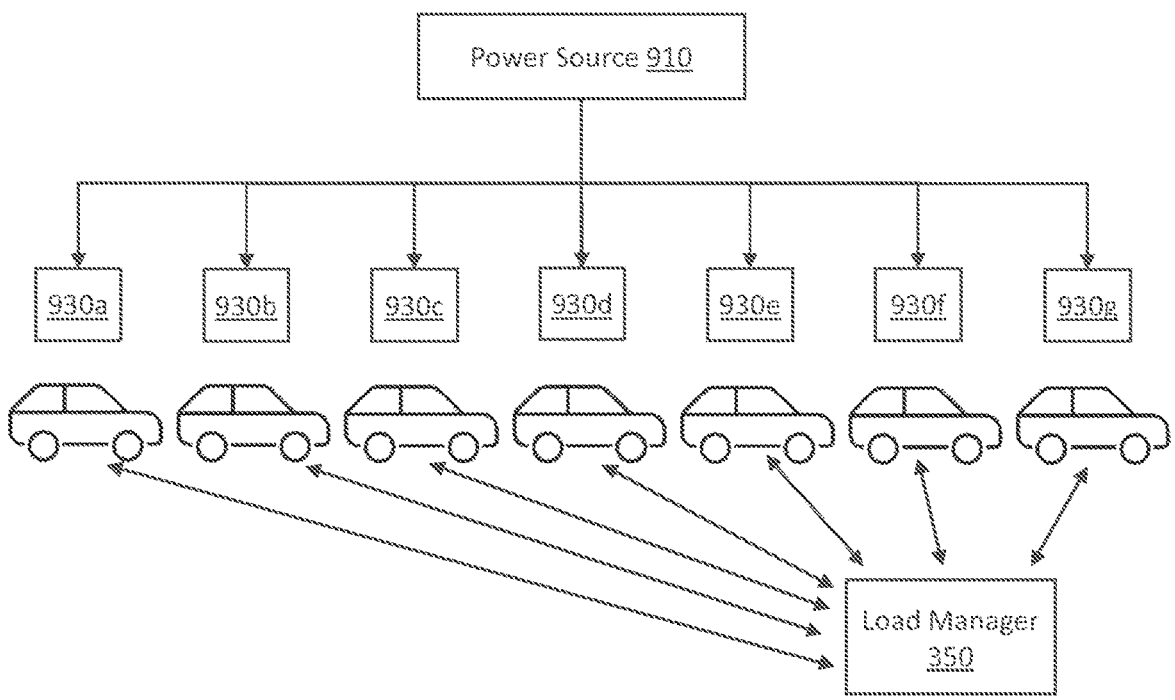
FIG. 9 illustrates independent charging stations distributing power from a power source to EVs along a charging lane, according to some embodiments of the present disclosure.

In some embodiments, the charging facility may not include a power management system 210. FIG. 9 illustrates independent charging stations distributing power from a power source to EVs along a charging lane, according to some embodiments of the present disclosure. In this embodiment, the load manager 350 is network-connected to the EVs 110, as described with respect to FIG. 8. The chargers 930 are directly connected to a power source 910, which may be similar to the power supply 310 described with respect to FIG. 3. In this example, each of the chargers 930 may include a power converter, similar to the power converter 320, for converting AC power from the power supply 310 to DC power. Alternatively, the power source 910 may provide DC power, or the chargers 930 may output AC power to the EVs 110.

In this embodiment, the load manager 350 determines the charge rates for each of the EVs as described with respect to FIG. 5. The load manager 350 instructs each EV in the charging lane to request, from its respective charger 930, a particular charge rate. Alternatively, the load manager 350 may be network-connected to the chargers 930, and the load manager 350 instructs each charger 930 to deliver a particular charge rate to the EV coupled to the charger 930.

In the examples described with respect to FIGS. 2-8, each connection between the power management system 210 and the chargers 130 is configured to deliver a variable amount of power, depending on the power distribution determination by the load manager 350. In an alternative implementation, more or fewer physical connections (e.g., wires) between the power management system 210 and a particular charger 130 dictates the power distributed from the power management system 210 to the charger 130. For example, a particular gauge of wire may only be suited to transmit a certain amount of power. To transmit a greater amount of power than the gauge allows, a second wire can be connected from the power management system 210 to the charger 130. In an automated facility, an actuator such as a robotic arm can be used to plug or unplug wires between the power management system 210 and the chargers 130.

Figure 10:
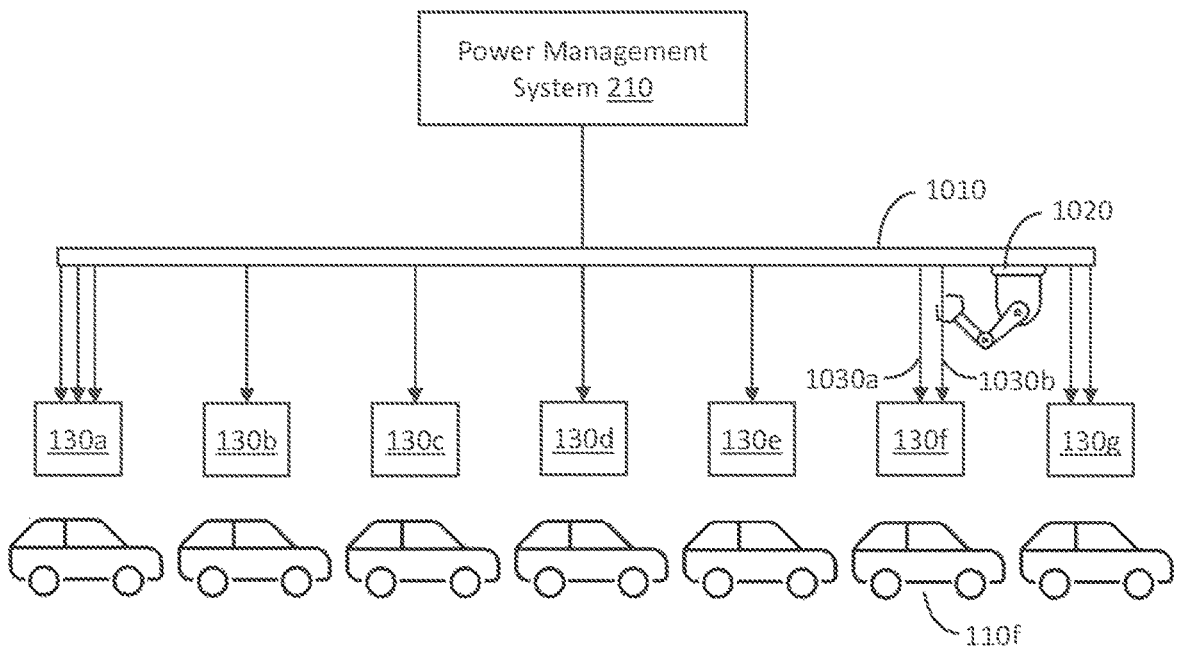
FIG. 10 illustrates the power management system distributing power to EVs along a charging lane where an actuator can add power from the power management system to a charger to increase power delivered to the EV coupled to the charger, according to some embodiments of the present disclosure.

FIG. 10 illustrates the power management system distributing power to EVs along a charging lane where an actuator can add power from the power management system to a charger to increase power delivered to the EV coupled to the charger, according to some embodiments of the present disclosure. In this example implementation, the power management system 210 is coupled to a power rail 1010 that distributes power to cables 1030. The cables 1030 can be plugged into or unplugged from the chargers 130 by an actuator 1020, e.g., a robotic arm that can move along the rail 1010. While one robotic arm is shown in FIG. 10, in other embodiments, more robotic arms may be included, e.g., two robotic arms, or a dedicated robotic arm for each charger 130. In some embodiments, each charger 130 has one fixed cable 1030 connecting to the rail 1010, and the actuator 1020 can add or remove additional cables 1030. In other embodiments, each of the cables 1030 can be added or removed from the chargers 130. Some or all of the cables 1030 may be able to move to different points along the rail 1010 so that a cable may be able to be attached to multiple different chargers 130.

In the example shown in FIG. 10, a first cable 1030a couples the charger 130f to the rail 1010, and the actuator 1020 is coupling a second cable 1030b to the rail 1010. This enables the power management system 210 to distribute a greater amount of power to the charger 130f and, thus, to the EV 110f. In some embodiments, each of the cables 1030 transmits a fixed amount of power, e.g., each cable 1030 transmits 50 kW. In this example, the charger 130a, which is connected to three cables 1030, receives 150 kW; the chargers 130b-130e, which are each connected to one cable 1030, each receive 50 kW; and chargers 130f and 130g, which are each connected to two cables 1030, each receive 100 kW. In other embodiments, the power management system 210 may transmit variable amounts of power through each cable 1030 up to a maximum amount of power. For example, each cable 1030 may carry up to 100 kW or any amount of power below 100 kW. For example, based on instructions from the load manager 350, the power management system 210 may transmit 180 kW to the charger 130f via the two cables 1030a and 1030b (e.g., 100 KW via the cable 1030a and 80 KW via the cable 1030b, or 90 kW via each of the cables 1030a and 1030b).

As described with respect to FIG. 4, in some embodiments, the power management system 210 may distribute more power to the ends of the charging lane than to the middle of the charging lane. In general, a lower gauge wire can transmit a greater amount of power than a higher gauge wire (i.e., a conductor with a larger cross-section can transmit a greater amount of power than a conductor with a smaller cross-section). Accordingly, in some implementations, the connections from the power management system 210 to the chargers 130 at the ends of the charging lane are formed using lower gauge conductors than connections from the power management system 210 to chargers 130 in the middle of the charging lane.

Figure 11:
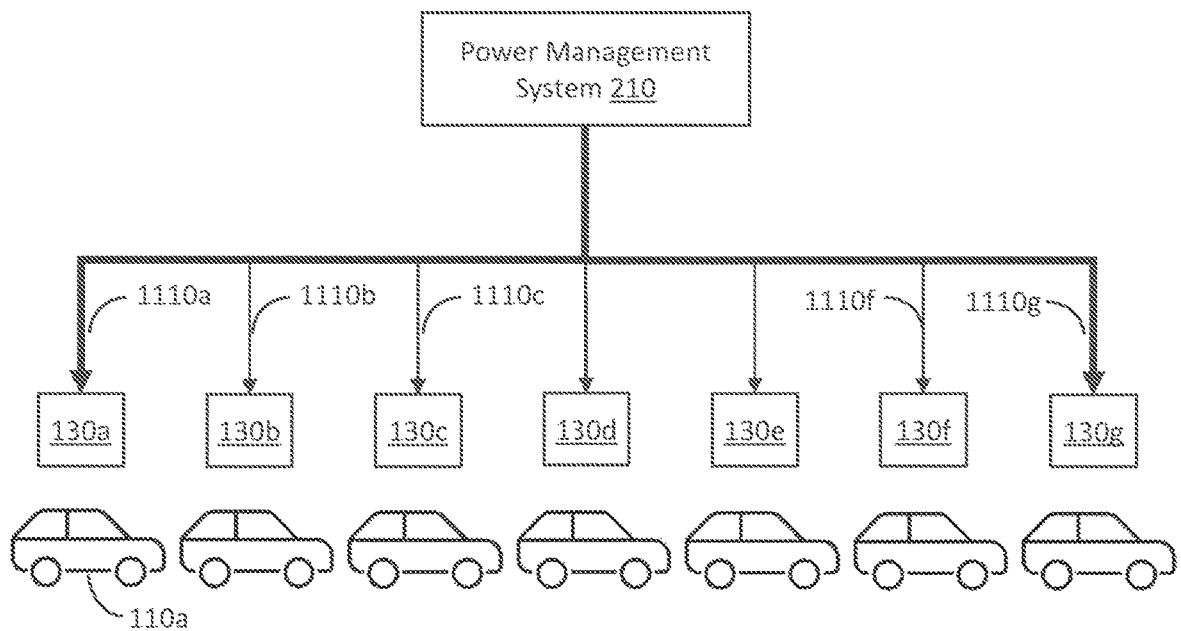
FIG. 11 illustrates the power management system distributing power to EVs along a charging lane with higher gauge conductors at the ends of the charging lane, according to some embodiments of the present disclosure.

FIG. 11 illustrates the power management system distributing power to EVs along a charging lane with higher gauge conductors at the ends of the charging lane, according to some embodiments of the present disclosure. In this implementation, the connectors 1110a and 1110g at the ends of the charging lane have a lower gauge than the connectors 1110b-1110f in the middle of the charging lane. While this example shows all of the connectors 1110 in the middle of the lane having the same gauge, in some examples, the gauge increases moving towards the center of the lane, e.g., the connector 1110b has a lower gauge than the connector 1110c. The power management system 210 may determine a different amount of power to distribute to each EV 110, so long as the amount of power can be transmitted over the connection. For example, if the EV 110a has a relatively high charge level, the power management system 210 may not transmit the full amount of power that the connector 1110a is able to transmit to the EV 110a; the load manager 350 may instead select a lower amount of power to charge the EV 110a, as described above.

Select Examples

Example 1 provides a system for charging EVs, the system including a power management system to receive power from a power source and distribute the power among a plurality of power outputs; a plurality of chargers arranged along a charging lane, each of the chargers coupled to a respective one of the plurality of power outputs to receive power from the power management system, and each of the chargers configured to be coupled to a respective one of a plurality of EVs positioned along the charging lane; and a load manager to receive data describing charge levels of batteries of the plurality of EVs; and determine an amount of power for the power management system to distribute to each of the plurality of EVs based on their charge levels and their respective charging positions along the charging lane.

Example 2 provides the system of claim 1, where the charging lane includes a charging position 1 and a charging position 2 adjacent to charging position 1, and an EV in charging position 2 cannot exit the charging lane prior to an EV in charging position 1 exiting the charging lane.

Example 3 provides the system of claim 2, where the charging lane further includes a charging position N and a charging position N-1 adjacent to charging position N, where charging position n is at an opposite end of the charging lane from the charging position 1, and an EV in charging position N-1 cannot reverse out of the charging lane prior to the EV in charging position N exiting the charging lane.

Example 4 provides the system of claim 2, where the load manager determines the amount of power to distribute to the EV at charging position 1 and the EV at charging position 2 such that the EV at charging position 1 reaches a first target charge level no later than the EV at charging position 2 reaches a second target charge level.

Example 5 provides the system of claim 1, where one of the plurality of chargers is configured for bidirectional charge flow, the load manager determines an amount of power for the one of the plurality of chargers to draw from an EV coupled to the charger, and the power management system transfers the power drawn from the EV coupled to the charger to at least one other EV positioned along the charging lane.

Example 6 provides the system of claim 1, where the load manager is further configured to receive a power supply level available to the power management system from the power source; and determine the amount of power for the power management system to distribute to each of the plurality of EVs based on the power supply level, where the power supply level is less than a sum of maximum charging rates of each of the plurality of EVs.

Example 7 provides the system of claim 1, where the power management system includes a power converter to convert an alternating current (AC) from the power source to a direct current (DC) to distribute to the chargers.

Example 8 provides the system of claim 1, where the power management system includes the load manager, and the load manager receives the data describing charge levels of batteries of the EVs from the charger coupled to each of the plurality of EVs.

Example 9 provides the system of claim 1, where the load manager is configured to receive, from each of the plurality of EVs, the data describing the charge level of the battery of the EV via a wireless network connection, and the load manager is configured to instruct each of the EVs to request the determined amounts of power from its respective charger.

Example 10 provides the system of claim 1, where one of the plurality of chargers is configured to be coupled to at least two power outputs of the power management system, and the system further includes an actuator to connect at least two power outputs to the charger based on the determined amount of power for the power management system to distribute to the EV coupled to the charger.

Example 11 provide a method for charging EVs, the method including receiving current charge levels for each of a plurality of EVs arranged along a charging lane, the charging lane including a plurality of chargers for charging the plurality of EVs; determining an amount of available power for charging the plurality of EVs arranged along the charging lane; determining, for each of the plurality of EVs, an amount of power to distribute to the EV, where the amount of power to distribute to a particular EV is based on a position of the EV along the charging lane and the current charge level of the EV; and distributing power to at least a portion of the plurality of EVs based on the determined amounts of power.

Example 12 provides the method of claim 11, where the charging lane includes a charging position 1 and a charging position 2 adjacent to charging position 1, and an EV in charging position 2 cannot exit the charging lane prior to an EV in charging position 1 exiting the charging lane.

Example 13 provides the method of claim 12, where the charging lane further includes a charging position N and a charging position N-1 adjacent to charging position N, where charging position n is at an opposite end of the charging lane from the charging position 1, and an EV in charging position N-1 cannot reverse out of the charging lane prior to the EV in charging position N exiting the charging lane.

Example 14 provides the method of claim 12, where determining, for each of the plurality of EVs, the amount of power to distribute includes determining a first amount of power to distribute to the EV at charging position 1; and determining a second amount of power to distribute to the EV at charging position 2; where first amount of power and the second amount of power are determined such that the EV at charging position 1 reaches a first target charge level no later than the EV at charging position 2 reaches a second target charge level.

Example 15 provides the method of claim 11, further including receiving a power supply level available charge the plurality of EVs; and determining the amount of power to distribute to each of the plurality of EVs based on the power supply level, where the power supply level is less than a sum of maximum charging rates of each of the plurality of EVs.

Example 16 provides the method of claim 11, further including receiving a battery characteristic for each of the plurality of EVs, the battery characteristic including one of an age of a battery, a state of health of the battery, and a remaining useful life of the battery; and determining the amount of power for the power management system to distribute to each of the plurality of EVs based on the battery characteristics.

Example 17 provides the method of claim 11, further including receiving a target charge level for one of the plurality of EVs, the target charge level less than a full charge of a battery of the one of the plurality of EVs; and determining the amount of power for the power management system to distribute to the one of the plurality of EVs based on the target charge level.

Example 18 provides a system for charging EVs, the system including a plurality of chargers arranged along a charging lane, the charging lane having a plurality of charging positions and an exit point, where a first charging position is situated between a second charging position and the exit point, each of the chargers coupled to a power source to receive power from the power source, and each of the chargers configured to be coupled to a respective one of a plurality of EVs positioned at a respective charging position; and a load manager to receive data describing charge levels of batteries of the plurality of EVs and the charging positions of the plurality of EVs within the charging lane; and determine an amount of power for each of the plurality of chargers to distribute to each of the plurality of EVs based on their charge levels and their respective charging positions.

Example 19 provides the system of claim 18, where the load manager is further configured to receive a power supply level available to the plurality of chargers from the power source; and determine the amount of power for the each of the plurality of chargers to distribute to each of the plurality of EVs based on the power supply level, where the power supply level is less than a sum of maximum charging rates of each of the plurality of chargers.

Example 20 provides the system of claim 18, where at least one of the plurality of charges includes a power converter to convert an alternating current (AC) from the power supply to a direct current (DC).

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A system for charging electric vehicles (EVs), the system comprising:
    a power management system to receive power from a power source and distribute the power among a plurality of power outputs;
    a plurality of chargers arranged along a charging lane, each of the chargers coupled to a respective one of the plurality of power outputs to receive power from the power management system, and each of the chargers configured to be coupled to a respective one of a plurality of EVs positioned along the charging lane, wherein the charging lane includes a charging position 1 and a charging position 2 adjacent to charging position 1, and an EV in charging position 2 cannot exit the charging lane prior to an EV in charging position 1 exiting the charging lane; and
    a load manager to:
        receive data describing charge levels of batteries of the plurality of EVs; and
        determine an amount of power for the power management system to distribute to each of the plurality of EVs based on their charge levels and their respective charging positions along the charging lane,
        wherein the load manager determines the amount of power to distribute to the EV at charging position 1 and the EV at charging position 2 such that the EV at charging position 1 reaches a first target charge level no later than the EV at charging position 2 reaches a second target charge level.

2. The system of claim 1, wherein the charging lane further includes a charging position N and a charging position N-1 adjacent to charging position N, wherein charging position n is at an opposite end of the charging lane from the charging position 1, and an EV in charging position N-1 cannot reverse out of the charging lane prior to the EV in charging position N exiting the charging lane.

3. The system of claim 1, wherein one of the plurality of chargers is configured for bidirectional charge flow, the load manager determines an amount of power for the one of the plurality of chargers to draw from an EV coupled to the charger, and the power management system transfers the power drawn from the EV coupled to the charger to at least one other EV positioned along the charging lane.

4. The system of claim 1, wherein the load manager is further configured to:
    receive a power supply level available to the power management system from the power source; and
    determine the amount of power for the power management system to distribute to each of the plurality of EVs based on the power supply level, wherein the power supply level is less than a sum of maximum charging rates of each of the plurality of EVs.

5. The system of claim 1, wherein the power management system comprises a power converter to convert an alternating current (AC) from the power source to a direct current (DC) to distribute to the chargers.

6. The system of claim 1, wherein the power management system includes the load manager, and the load manager receives the data describing charge levels of batteries of the plurality of EVs from the charger coupled to each of the plurality of EVs.

7. The system of claim 1, wherein the load manager is configured to receive, from each of the plurality of EVs, the data describing the charge level of the battery of the EV via a wireless network connection, and the load manager is configured to instruct each of the EVs to request the determined amounts of power from its respective charger.

8. The system of claim 1, wherein one of the plurality of chargers is configured to be coupled to at least two power outputs of the power management system, and the system further comprises an actuator to connect at least two power outputs to the charger based on the determined amount of power for the power management system to distribute to the EV coupled to the charger.

9. A method for charging electric vehicles (EVs), the method comprising:
receiving current charge levels for each of a plurality of EVs arranged along a charging lane, the charging lane comprising a plurality of chargers for charging the plurality of EVs, wherein the charging lane includes a charging position 1 and a charging position 2 adjacent to charging position 1, and an EV in charging position 2 cannot exit the charging lane prior to an EV in charging position 1 exiting the charging lane;
determining an amount of available power for charging the plurality of EVs arranged along the charging lane;
determining, for each of the plurality of EVs, an amount of power to distribute to the EV, wherein the amount of power to distribute to a particular EV is based on a position of the EV along the charging lane and the current charge level of the EV, and wherein determining, for each of the plurality of EVs, the amount of power to distribute comprises:
determining a first amount of power to distribute to the EV at charging position 1; and
determining a second amount of power to distribute to the EV at charging position 2, wherein the first amount of power and the second amount of power are determined such that the EV at charging position 1 reaches a first target charge level no later than the EV at charging position 2 reaches a second target charge level; and
distributing power to at least a portion of the plurality of EVs based on the determined amounts of power.

10. The method of claim 9, wherein the charging lane further includes a charging position N and a charging position N-1 adjacent to charging position N, wherein charging position n is at an opposite end of the charging lane from the charging position 1, and an EV in charging position N-1 cannot reverse out of the charging lane prior to the EV in charging position N exiting the charging lane.

11. The method of claim 9, further comprising:
receiving a power supply level available charge the plurality of EVs; and
determining the amount of power to distribute to each of the plurality of EVs based on the power supply level, wherein the power supply level is less than a sum of maximum charging rates of each of the plurality of EVs.

12. The method of claim 9, further comprising:
receiving a battery characteristic for each of the plurality of EVs, the battery characteristic including one of an age of a battery, a state-of-health of the battery, and a remaining useful life of the battery; and
determining the amount of power for a power management system to distribute to each of the plurality of EVs based on the battery characteristics.

13. The method of claim 9, further comprising:
receiving a target charge level for one of the plurality of EVs, the target charge level less than a full charge of a battery of the one of the plurality of EVs; and
determining the amount of power for a power management system to distribute to the one of the plurality of EVs based on the target charge level.

14. A system for charging electric vehicles (EVs), the system comprising:
a plurality of chargers arranged along a charging lane, the charging lane having a plurality of charging positions and an exit point, wherein a first charging position is situated between a second charging position and the exit point, each of the chargers coupled to a power source to receive power from the power source, and each of the chargers configured to be coupled to a respective one of a plurality of EVs positioned at a respective charging position, wherein the charging lane includes a charging position 1 and a charging position 2 adjacent to charging position 1, and an EV in charging position 2 cannot exit the charging lane prior to an EV in charging position 1 exiting the charging lane; and
a load manager to:
receive data describing charge levels of batteries of the plurality of EVs and the charging positions of the plurality of EVs within the charging lane; and
determine an amount of power for each of the plurality of chargers to distribute to each of the plurality of EVs based on their charge levels and their respective charging positions,
wherein the load manager determines the amount of power to distribute to the EV at charging position 1 and the EV at charging position 2 such that the EV at charging position 1 reaches a first target charge level no later than the EV at charging position 2 reaches a second target charge level.

15. The system of claim 14, wherein the load manager is further configured to:
receive a power supply level available to the plurality of chargers from the power source; and
determine the amount of power for the each of the plurality of chargers to distribute to each of the plurality of EVs based on the power supply level, wherein the power supply level is less than a sum of maximum charging rates of each of the plurality of chargers.

16. The system of claim 14, wherein at least one of the plurality of charges comprises a power converter to convert an alternating current (AC) from the power source to a direct current (DC).

* * * * *